United States Patent [19]

Heidemann et al.

[11] Patent Number: 5,162,937
[45] Date of Patent: Nov. 10, 1992

[54] OPTICAL CABLE TELEVISION TRANSMISSION SYSTEM

[75] Inventors: Rolf Heidemann, Tamm; Heinz Krimmel, Stuttgart, both of Fed. Rep. of Germany

[73] Assignee: Alcatel N.V., Netherlands

[21] Appl. No.: 641,187

[22] Filed: Jan. 15, 1991

[30] Foreign Application Priority Data

Jan. 16, 1990 [DE] Fed. Rep. of Germany ....... 4001039

[51] Int. Cl.$^5$ .............................................. H04J 14/02
[52] U.S. Cl. .................................... 359/124; 359/154
[58] Field of Search ............... 359/124, 154, 162, 181, 359/125, 132; 455/47, 109, 203, 59; 375/38, 61; 370/120; 332/170

[56] References Cited

U.S. PATENT DOCUMENTS

| | | | |
|---|---|---|---|
| 4,691,375 | 9/1987 | McGeehan et al. | 455/47 |
| 4,722,081 | 1/1988 | Fujito et al. | 359/132 |
| 5,016,242 | 5/1991 | Tang | 359/124 |
| 5,020,049 | 5/1991 | Bodeep et al. | 359/124 |
| 5,058,102 | 10/1991 | Heidemann | 359/125 |

FOREIGN PATENT DOCUMENTS

| | | |
|---|---|---|
| 3010802 | 9/1981 | Fed. Rep. of Germany . |
| 3203785 | 8/1983 | Fed. Rep. of Germany . |
| 0394772 | 10/1990 | Fed. Rep. of Germany . |
| 521340 | 5/1940 | United Kingdom . |

OTHER PUBLICATIONS

Meeting of the Society of Cable Television Engineers, Jan. 18-20, 1988, pp. 5-6.
Patent Abstracts of Japan, Band 6, Nr. 42 (E-098), 16, März 1982 & JP-A-56 158 532 (Yagi Antenna) 07-1-2-1981 *Zusammenfassung*.
IEEE Journal on Selected Areas in Communications, Band 6, Nr. 6, Jul. 1988, Seiten 974-986, IEEE, New York, N.Y. US; G. J. Foschini: "Sharing of the Optical Band in Local Systems" * Seite 976, rechte Spalte, Absatz 2-Seite 977, linke Spalte, Absatz 3*.

Primary Examiner—Edward L. Coles, Sr.
Assistant Examiner—Kinfe-Michael Negash
Attorney, Agent, or Firm—Ware, Fressola, Van Der Sluys & Adolphson

[57] ABSTRACT

The invention is based on the problem of transmitting a frequency-division multiplex signal occupying a board frequency band, e.g., the cable television frequency band of 47-440 MHz, over an optical waveguide transmission section. According to the invention, in the transmitting unit, the whole frequency band to be transmitted is divided into two sub-bands ($FB_1$, $FB_2$), and the lower sub-band ($FB_1$) is converted by means of single-sideband amplitude modulation of a high-frequency carrier ($f_0$) into a higher-frequency transmission frequency band, e.g. 497-688 MHz, which is less than one octave in width, based on its lowest frequency. The lower sub-band ($FB_1$) and the transmission frequency band produced by the conversion are converted separately into optical signals with different wavelengths ($\lambda_1$, $\lambda_2$) and are transmitted in a wavelength multiplex procedure via the optical waveguide. Because of the limitation of less than one octave, second-order intermodulation products, which are usually formed during conversion into an optical signal, fall into unoccupied frequency regions. A corresponding reverse processing is carried out on the receiving side.

22 Claims, 4 Drawing Sheets

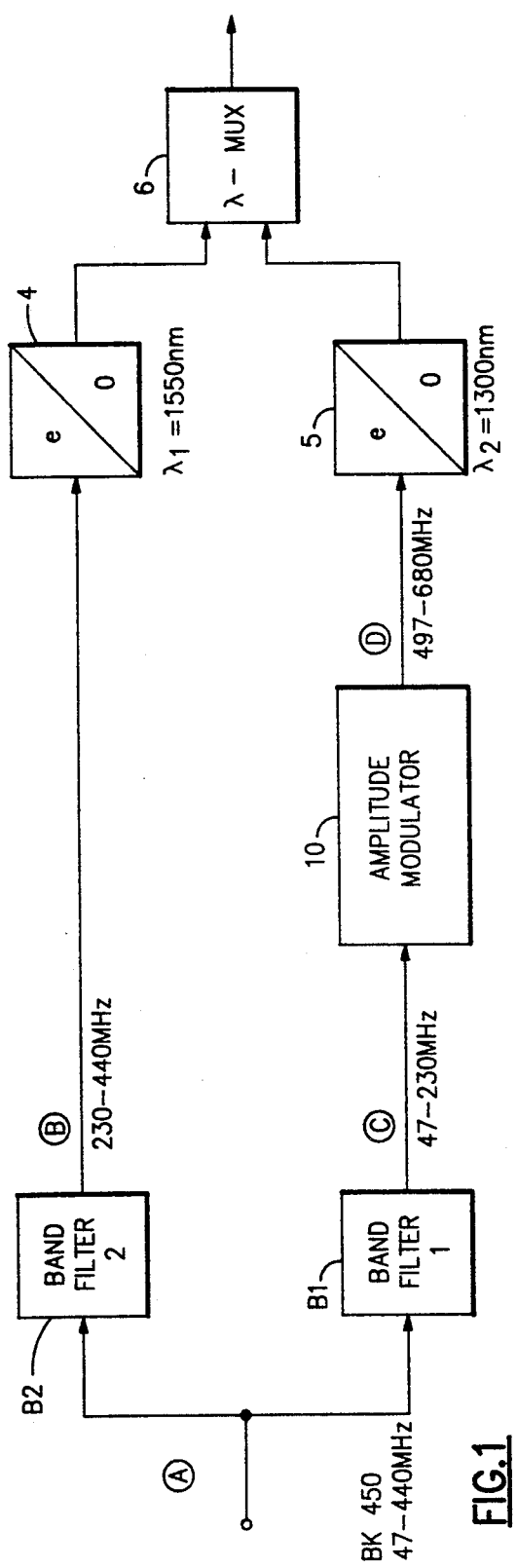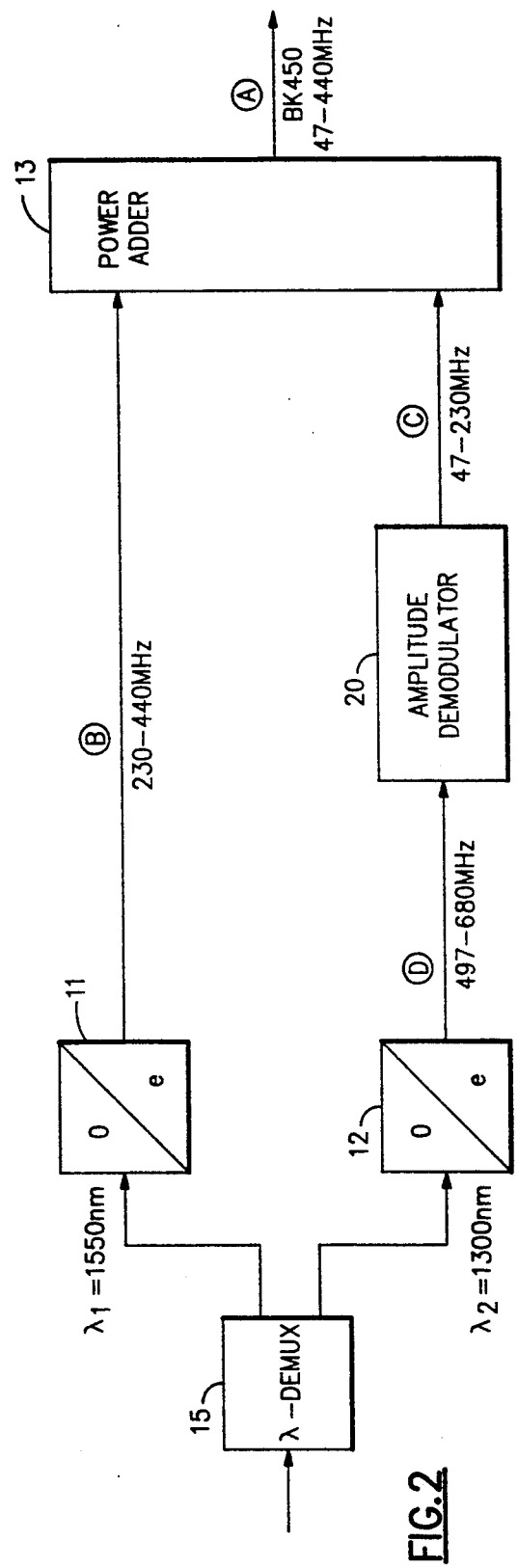
FIG.1
FIG.2

OPTICAL CABLE TELEVISION TRANSMISSION SYSTEM

BACKGROUND OF THE INVENTION

1. Field of the Invention

The present invention relates to a system for optically transmitting a frequency-division multiplex signal over a single optical waveguide, and more particularly to the transmission of a side band signal.

2. Description of the Prior Art

The problem of transmission of a frequency-division multiplex signal occupying a wide frequency band arises, for example in cable television transmission. In this example, a multiplicity of signals, each of which contains a television or radio program, must be transmitted.

A system for providing such transmission is known from German Patent Application A1 32 03 785, FIG. 4. In the known system, the whole frequency-division multiplex signal is transmitted by means of a single optical waveguide through the fact that several transmission frequency bands are formed, each of these transmission frequency bands is converted to an optical signal with its own wavelength, and the optical signals are transmitted in the wavelength multiplex mode via the optical waveguide. On the reception side, a reverse processing operation is carried out. The first part of the transmitting unit divides the originally wide frequency band and thus forms the transmission frequency bands. In the known process, it is not indicated how the different transmission frequency bands are to be selected, so that they will have the bandwidth suitable for the various optical transmitters.

SUMMARY OF THE INVENTION

It is therefore an object of the invention to create a system for the optical transmission of the above-mentioned wide band frequency-division multiplex signal via a single optical waveguide.

The object is achieved by a system, comprising a transmitter unit including a first portion which generates two or more transmission frequency bands by dividing the wide frequency band into sub-bands and converting at least one of the resulting sub-bands by single-sideband amplitude modulation of a carrier, to thereby generate at least two transmission frequency bands, each of which, referred to its lowest frequency, is less than one octave wide, and a second portion which converts the generated transmission frequency bands into optical signals of different wavelengths and combines said optical signals into a wavelength-division multiplex signal representing the optical signal to be transmitted; and a receiver including a first portion which recovers the transmission frequency bands from the transmitted optical signal, and a second portion which recovers the frequency-division multiplex signal occupying the wide frequency band from said recovered transmission frequency bands by a corresponding reverse processing operation from that of the first portion of the transmitter unit.

The significant advantage of the invention is that, for each of the optical transmitters, the electrical input signal, which is to be converted to an optical signal by intensity modulation, has a bandwidth of less than one octave, based on its lowest frequency. As a result, the second-order intermodulation products, which arise as a result of non-linearities of the laser, have frequencies flowing into unoccupied frequency ranges, which can be easily filtered out in the receiving unit. As a result of this, in each of the optical transmitters, the laser can be rejected to a greater extent, so that a large area attenuation can be bridged over. As a result of the fact that the whole wide frequency band is processed to form parts of lower bandwidth, the modulator in the transmitting unit and the demodulator in the receiving unit need not meet any high bandwidth requirements.

DESCRIPTION OF THE DRAWINGS

FIG. 1 is a block diagram of the transmitting unit of the system according to the invention.

FIG. 2 is a block diagram of the associated receiving unit of the system according to the invention.

DETAILED DESCRIPTION OF THE PREFERRED EMBODIMENT

The invention will be described with reference to a cable television distribution network, but it is pointed out that it covers any applications in which a multiplicity of signals of different frequencies, occupying a wide frequency band, i.e., a wide band frequency-division multiplex signal, is to be transmitted from one point to one or more other points.

Figure 3:
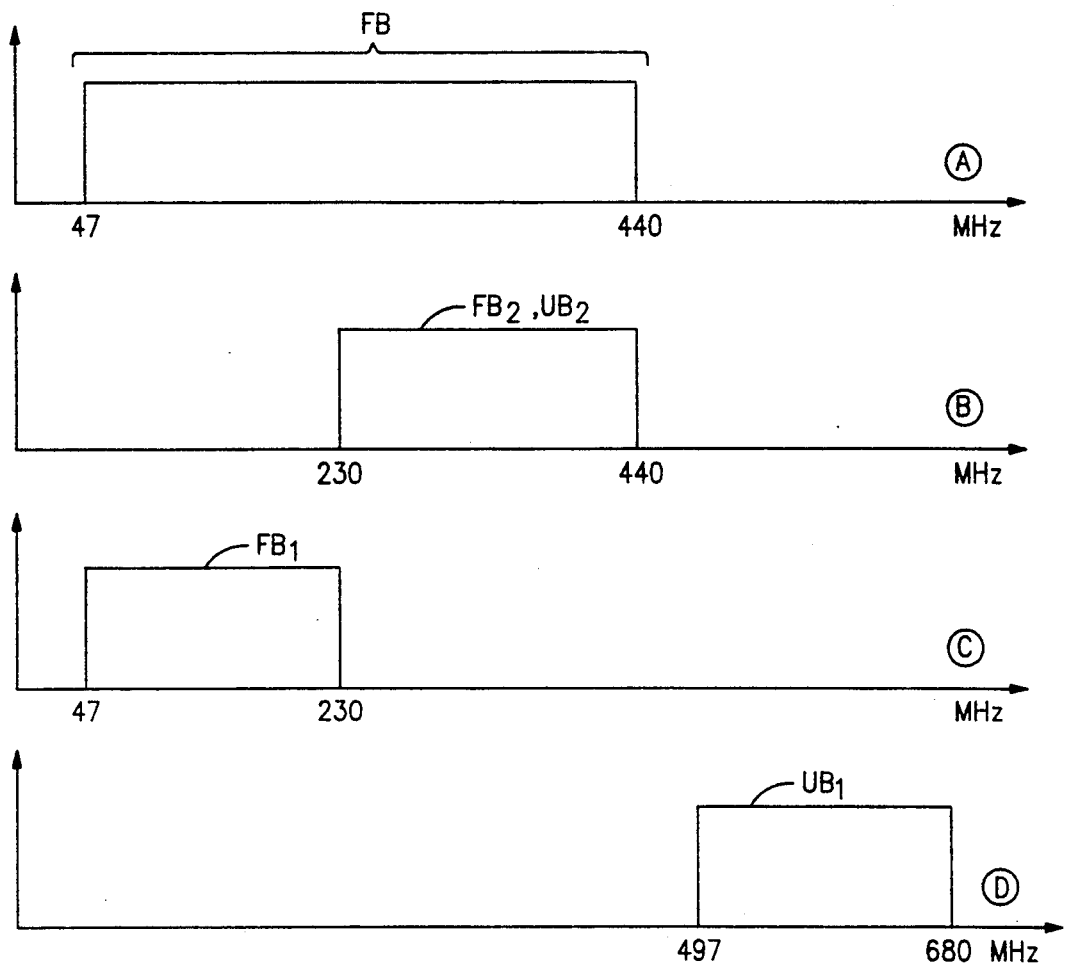
FIG. 3 shows the signal spectra, to explain the signal processing according to the invention.

A band of signals of different frequencies, e.g., for television and radio transmission, according to the coaxial-KTV-system BK 450 of the German Postal Service with a bandwidth of 47–440 MHz, is input to an input of the transmission unit according to FIG. 1. From the input, the signals pass in parallel to two different band filters B1 and B2. The wide frequency band present there is designated as FB in a spectrum A of FIG. 3. The band filters B1 and B2 are bandpass filters, each of which filters out a special frequency range from the wide frequency band. Thus, the band filter B1 transmits a lower part $FB_1$ (FIG. 3) from 47–230 MHz, and the upper band filter transmits an upper part $FB_2$ from 230–440 MHz. In other words, the wide frequency band FB is divided into two sub-bands by means of the band filters B1 and B2. Spectra C and B in FIG. 3 are a schematic representation of the sub-bands appearing at the outputs of the filters B1 and B2, which are designated in the same manner.

According to the invention, by means of the division of the wide frequency band FB into sub-bands and their further processing, transmission frequency bands are produced, each of which, based on its lowest frequency, is less than one octave wide, and each of these transmission bands is converted by an optical transmitter into an optical signal.

In the exemplifying embodiment according to FIG. 1, the sub-band appearing at the output B of the band filter B2 has a frequency range of 230–440 MHz, i.e., a bandwidth of less than one octave, i.e., this sub-band can be used as a transmission frequency band without further processing. In FIG. 3, the spectrum B therefore designated not only by the designation $FB_2$ for sub-band, but also with the designation $UB_2$ for transmission frequency band. The sub-band appearing at the output C of the band filter B1 has a frequency range of 47–230 MHz and is designated as $FB_1$ in FIG. 3. Since it is much more than one octave in width, it is converted by single-sideband amplitude modulation to a higher-frequency transmission frequency band, which is less than one octave wide. In the exemplifying embodiment, this is a transmission frequency band $UB_1$ (FIG. 3), with a frequency range of 497–680 MHz.

Figures 4, 5:
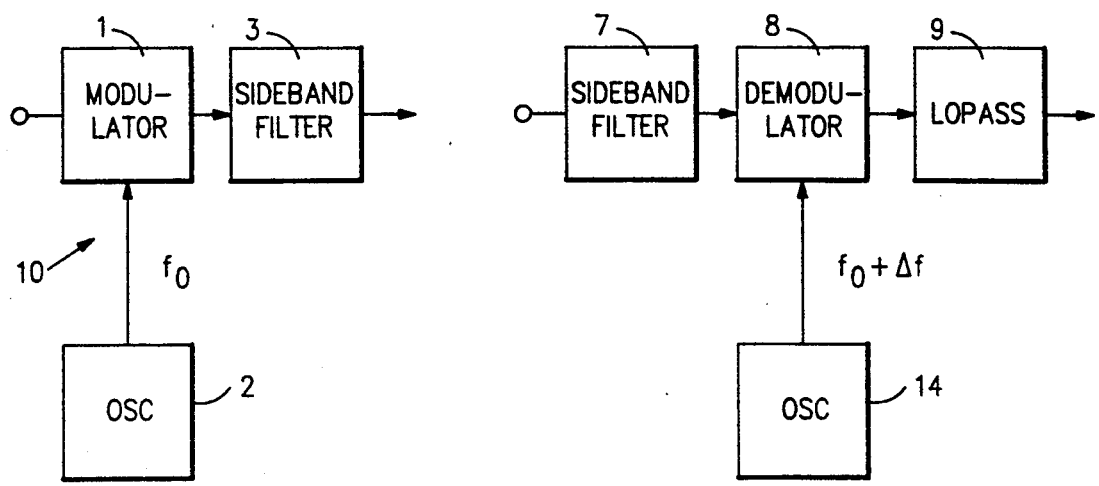
FIG. 4 is a block diagram of a first exemplifying embodiment of a modulator 10 from FIG. 1.
FIG. 5 is a block diagram of an exemplifying embodiment of a demodulator 20 from FIG. 2.

For the purpose of single-sideband amplitude modulation, the transmitting unit according to FIG. 1 contains a single-sideband amplitude modulator 10, shown in FIG. 4. Referring to FIG. 4, the modulator is provided with a carrier signal generated by an oscillator 2 with a carrier frequency $f_0$ of, for example, 450 MHz. Details on the single-sideband amplitude modulation will be presented later on.

For optical transmission of the transmission frequency bands $UB_2$ and $UB_1$, which are formed as described, two optical transmitters, also called electrical-to-optical transducers, are present an optical transmitter 4, with an operating wavelength $\lambda_1$ of 1550 nm for the transmission frequency band of 230–440 MHz and an optical transmitter 5 with an operating wavelength $\lambda_2$ of 1300 nm for the transmission frequency band $UB_1$ (spectrum D in FIG. 3). These two optical transmitters form optical signals with the above-mentioned wavelengths from their electrical input signal, which is less than one octave in, width, by intensity modulation of their laser. Theses optical signals of different wavelengths are grouped together into an optical wavelength multiplex signal by means of a wavelength multiplexer 6, and the resulting wavelength multiplexed optical signal is transmitted by means of the single optical waveguide from the output of the optical transmitting unit according to FIG. 1 through the optical receiving unit of the system, which is shown in FIG. 2.

It is, of course, also possible, and may even be required in the case of frequency bands wider than that considered here, to divide the wide frequency band into more than two sub-bands and then, as in the example under consideration here, to convert those sub-bands that are wider than one octave, by means of single-sideband amplitude modulation, to transmission bands below one octave in width.

The receiving direction of the system, corresponding to the transmission direction according to FIG. 1, will now be explained with reference to FIG. 2. The received wavelength multiplex signal is divided in a wavelength demultiplexer 15 into the two optical signals with wavelengths $\lambda_1$ and $\lambda_2$, and the two optical signals are converted in optical receivers 11 and 12, also referred to as optical-to-electrical transducers, into electrical signals occupying the transmission frequency bands from 230–440 MHz and from 497–680 MHz. These transmission frequency bands, designated as spectra B and D in FIG. 3, thus appear at the outputs of the optical receivers 11 and 12. The transmission frequency band $UB_1$ of 497–680 MHz appearing at the output of the optical receiver 12 is converted in a single-sideband amplitude demodulator 20 to the original sub-band $FB_1$ (spectrum C in FIG. 3) of 47–230 MHz. A power adder 13 finally groups together the sub-band $FB_2$ appearing at the output of the optical receiver 11 (spectrum B in FIG. 3) and the sub-band $FB_1$ appearing at the output of the single-sideband amplitude demodulator 20 to the original frequency band (spectrum A in FIG. 3) with the frequency range 47–440 MHz.

The next part of the specification relates to the design of the single-sideband amplitude modulator 10 of the transmitting unit according to FIG. 1 and of the single-sideband amplitude demodulator 20 of the receiving unit according to FIG. 2. An exemplifying embodiment of the single-sideband amplitude modulator 10 of FIG. 1 is shown in FIG. 4. The frequency band to be converted is input to the modulator 1 in the single-sideband amplitude modulator 10. This modulator receives from the carrier frequency generator 2 the carrier with the frequency $f_0$, with a value of 450 MHz in the example, and initially causes a double-sideband amplitude modulation of the carrier. A filter 3 connected in series with the modulator 1 passes the upper sideband of the output signal of the modulator 1 and transmits this as the output of the single-sideband amplitude modulator 10 (FIG. 1). The filter 3, as mentioned, transmits the upper sideband and is a bandpass filter for the upper sideband. Instead of the upper sideband, the lower sideband could also be used. In that case, the filter 3 would have to be a bandpass filter for the lower sideband. In each case, it is a single-sideband filter.

The modulator 1, which can also be designated as a mixer, the oscillator 2, and the single-sideband filter 3 thus, when taken together, form a single-sideband amplitude modulator. This converts its input frequency band, by single-sideband amplitude modulation of a high-frequency carrier, to a higher-frequency band. The latter is referred to below as the transmission frequency band, because it is the frequency band formed for the purpose of optical transmission, e.g., a frequency band used for intensity modulation of a semiconductor laser.

The function of the modulator 10 of FIG. 1 described above will now be explained in greater detail with reference to FIG. 4.

Mixing of the 47–230 MHz signal from the filter B1 with the carrier, having the frequency $f_0$, in the modulator 1 initially forms a double-sideband amplitude modulation with a lower frequency band and a higher frequency band. In this modulation, depending on the design of the mixer, the carrier can be suppressed or may still be present in the output signal of the modulator. The signal spectrum with the carrier is used for intensity modulation of the semiconductor laser if the carrier is to be transmitted to the receiving unit.

The single-sideband amplitude demodulator 20 according to FIG. 2, shown in greater detail in FIG. 5, receives an electrical signal from the output of the optical receiver, whose spectrum essentially has the appearance of spectrum D in FIG. 3, but which contains intermodulation products with frequencies below the carrier frequency $f_0$. To remove these, the spectrum is filtered in a single-sideband filter 7, so that a spectrum is formed by suppression of the carrier, provided this is possible at reasonable cost. A demodulator 8, which could also be designated as a mixer, mixes the spectrum with the carrier $f_0$, and a low-pass filter 9 connected in series provides, at its output, the transmitted signal that has been reconverted to the original frequency band $FB_1$, as shown as the spectrum C in FIG. 3.

The carrier $f_0$ required for the demodulator 8 can be made available by recovering it from the received signal. For this purpose, a carrier recovery circuit is required, for which several examples will be given later on. The carrier $f_0$ is transmitted from the transmitting direction to the receiving direction of the system by the fact that, as explained above, it is not suppressed during the single-sideband amplitude modulation. However, if the modulator 1 and the single-sideband filter 3 have the property of suppressing the carrier, then it can also be tapped off from the output of the generator 2, amplified or attenuated in a suitable manner, and added to the output signal of the single-sideband filter 3.

There are also applications in which it is not urgently necessary for the frequency band appearing at the output of the demodulator 20 to precisely coincide in frequency with the frequency band fed into the modulator 10 of the transmitting device, so that a frequency shift of $\Delta f$ can be tolerated.

This is the case, for example, when it is not necessary for a further signal processing step, e.g., modulation, multiplex formation, etc., to take place at the output of the receiving unit, for the purpose of a subsequent remote transmission, that where the frequency band is input directly into the end units for which its signals are intended, e.g., television receivers. These end units tolerate the frequency shift. The receiver itself also tolerates a shift in the frequency or phase of the carrier. A carrier recovery can therefore be completely dispensed with in such cases.

For such cases, the exemplifying embodiment according to FIG. 5 is suitable, in which the carrier is not recovered from the received signal but is generated in the receiving unit in a freely oscillating generator 14 present there. The generator 14 generates a carrier which, except for an inaccuracy of $\Delta f$ is identical to the carrier generated by the generator 2 of the transmitting unit. In this case, a single-sideband filter such as the filter 3 of FIG. 4 is appropriately used in the transmitting unit, which suppresses the carrier as much as possible.

An exemplifying embodiment of the invention, which relates to the single-sideband amplitude modulator 10 of the transmitting unit according to FIG. 1, will now be explained with reference to FIG. 6. The frequency band to be converted is input in parallel into three different band filters $B_{10}-B_{12}$, with each band filter filtering out a special sub-band from the band. The sub-bands are selected in such a way that the sub-bands produced are less than one octave wide, based on the lower limiting frequency, and that each of the signals contained in the band lies in one of the sub-bands. (Unoccupied areas of the band can be suppressed.) The band is thus divided into three sub-bands. The subdivision into sub-bands present in the band can also be taken into consideration. For example, the band can be divided into the following three sub-bands by means of the band filters $B_{10}-B_{12}$:
Sub-band 1 = 47–68 MHz
Sub-band 2 = 88–108 MHz
Sub-band 3 = 125–230 MHz Connected in series with each of the band filters $B_{10}-B_{12}$ is a modulator $M_{10}-M_{12}$, which could also be designated as a mixer, and which, as described with reference to FIG. 4, mixes its input frequency band with the carrier generated by the carrier oscillator 2. As also shown in FIG. 4, connected in series with each modulator is a single-sideband filter $E_{10}-E_{12}$, which suppresses the lower sideband.

Each modulator, together with the single-sideband filter connected in series with it, thus forms a modulator that converts the frequency band fed to it into a higher frequency band by single-sideband amplitude modulation of the high-frequency carrier. This frequency band is amplified by one of the amplifiers $V_{10}-V_{12}$ and all four amplified frequency bands are added in a passive power adder 40, so that a signal mixture with a spectrum according to spectrum D of FIG. 3 is formed. This signal mixture is used for intensity modulation of the laser. As described with reference to FIG. 4, when using a single-sideband amplitude modulator according to FIG. 6, the carrier can be suppressed or transmitted or can be added directly from the output of the oscillator.

Figure 6:
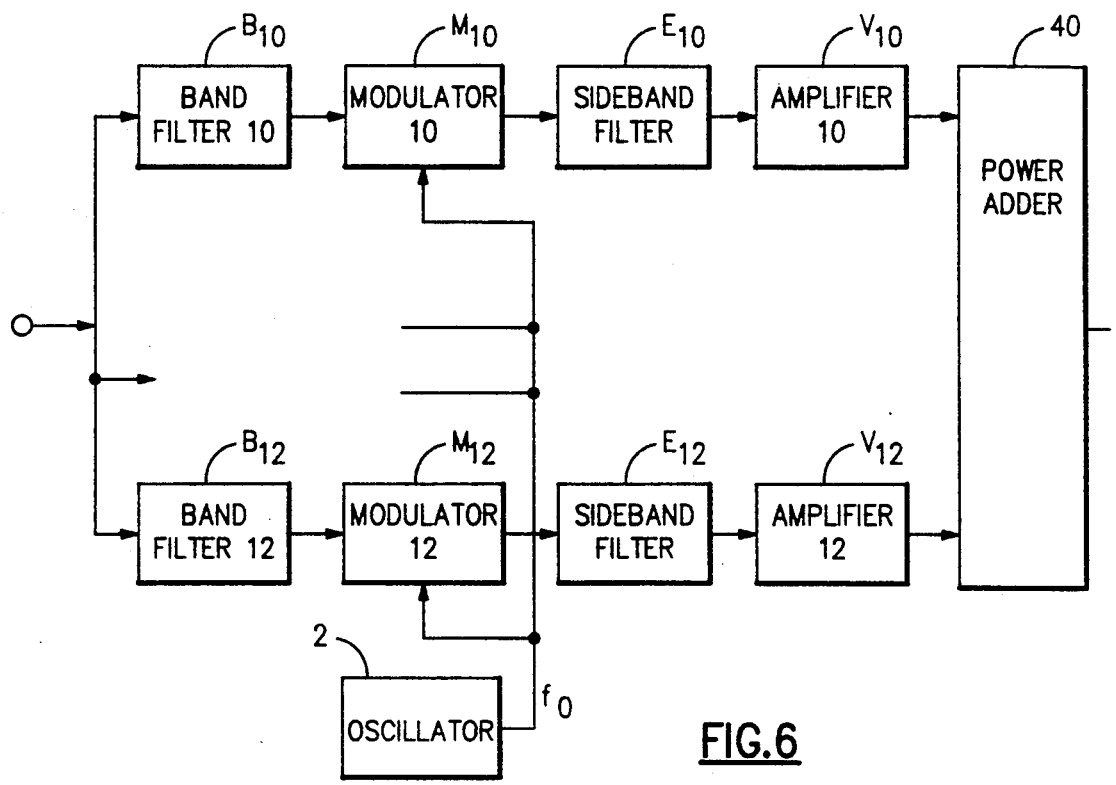
FIG. 6 is a block diagram of a second exemplifying embodiment of a modulator 10 from FIG. 1, in which the frequency band is converted in several parts to the transmission frequency band.

The single-sideband amplitude modulator according to FIG. 6 is also based on the fact that the frequency band to be transmitted is converted to a transmission frequency band by single-sideband amplitude modulation of a high-frequency carrier. It has the special feature that the frequency band is divided into several parts and, in accordance with this, is converted in several parts to the transmission frequency band.

The advantage of the single-sideband amplitude modulator according to FIG. 6 is found in the fact that second-order intermodulation products of any signal of the input signal mixture of a modulator are located in a frequency range that does not contain any further signals from the input signal mixture of the same modulator. No input signal of a modulator can therefore interfere with intermodulation products of another input signal of the same modulator.

A further advantage is the fact that the branches, which are largely independent of each other, can be designed according to different reliability or quality requirements. Through the division into several branches, a stepwise build-up of the system in accordance with increasing communications requirements of the connected subscribers is also possible. The same advantage also already applies for the two branches of the joint transmission or reception unit according to FIG. 1 and FIG. 2 respectively.

Figure 7:
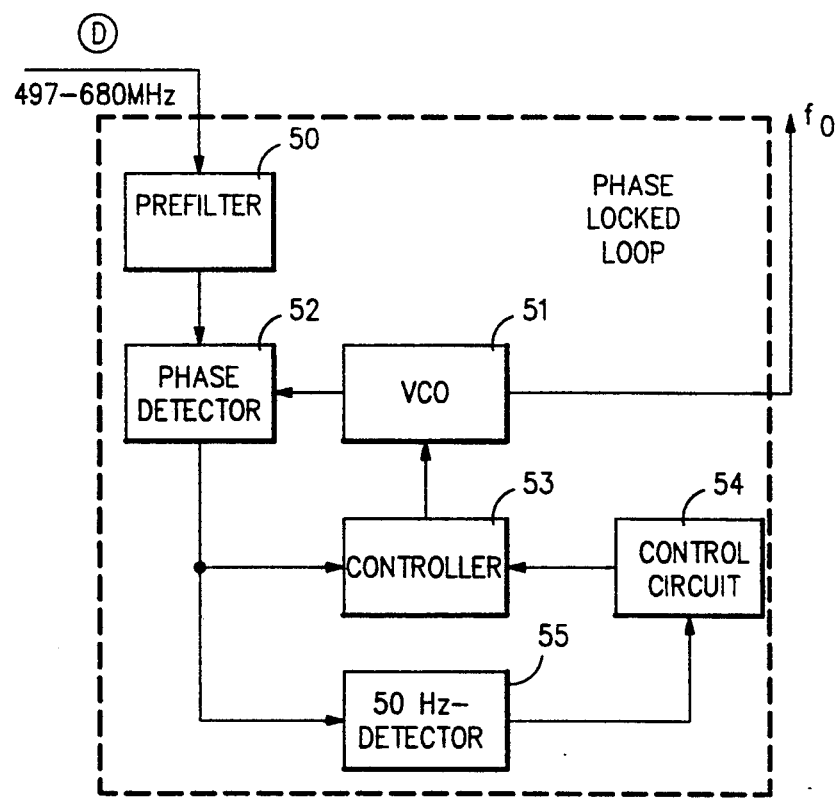
FIG. 7 is a block diagram of a first exemplifying embodiment of a carrier recovery circuit with phase-locked loop.

A first exemplifying embodiment of the above-mentioned carrier recovery circuit will now be explained in reference to FIG. 7. This essentially involves a known phase-locked loop (PLL), consisting of a voltage-controlled oscillator (VCO) 51, a phase detector 52 and a controller 53. The input signal is the spectrum that appears at the output of the optical receiver 12 in FIG. 2. It is fed into the input of a pre-filter 50, which suppresses the signal spectrum by more than 10 dB relative to the carrier. A surface wave filter of intermediate quality (several hundred) is suitable for this purpose. The phase detector 52 receives the spectrum containing the transmitted carrier from the pre-filter 50. By comparison of the carrier received by an oscillating signal pre-filter 50 with the generated by the oscillator 51, this generates a control parameter for the controller 53, which then controls the oscillator 51 in such a way that the carrier oscillation frequency generated by the VCO 51 is identical in frequency with the received carrier frequency $f_0$.

The previously described phase-locked loop is to be dimensioned such that a residual modulation is reliably suppressed by the signal located at a frequency of $f_0+40$ MHz. In the unlocked state of the phase-locked loop, particularly if the phase-locked loop does not receive an input signal from the pre-filter 50 (e.g., in case of interruption of the transmission section, with the transmitter turned off), the oscillator 51 could oscillate at a frequency that is in the vicinity of the frequency of the image carrier of a television signal located at $f_0+40$ MHz. In that case, the oscillator could be synchronized with the frequency of this image carrier in an undesirable manner.

To prevent this from happening, a control circuit 54 is present which can be designated as a "locking aid". This controls the controller 53 of the phase-locked loop in the unlocked state in such a way that the frequency of the oscillator $f_{0VCO}$ in this state is definitely below the (pre-set) frequency $f_0$. (When the lower sideband is used, $f_{0VCO}$ must be above $f_0$.) When the phase-locked loop then receives a reference signal from the pre-filter 50, which is in the captured range of the phase-locked loop (i.e., when the difference between $f_0$ and $f_{0VCO}$ is smaller than the captured range), then the loop synchronizes itself to this reference signal $f_0$ and the undesired synchronization described above is ruled out.

If, for any reason, the phase-locked loop should synchronize itself with an image carrier, then a signal is produced at the output of the phase detector 52 in which a component with a value of 50 Hz (half-image frequency) is dominant. For this purpose, a 50 Hz detector 55 is present, which monitors the output signal of the phase detector and, if it detects the component, transmits a control signal to the locking aid 54, so that this causes a resynchronization.

Figure 8:
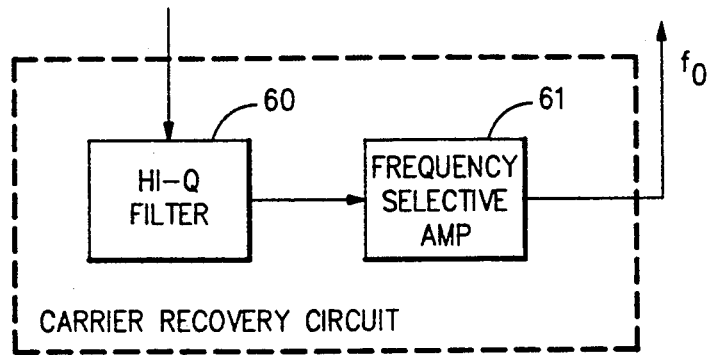
FIG. 8 is a block diagram of a second exemplifying embodiment of a carrier recovery circuit with a filter and a carrier amplifier.

A second exemplifying embodiment of a carrier recovery circuit is shown in FIG. 8. In this case, the spectrum containing the transmitted carrier reaches a high-quality filter 60, which suppresses the residual signal relative to the carrier $f_0$ and a frequency-selective carrier amplifier 61 amplifies the carrier present in the output signal of the filter 60. A suppression of the residual signal relative to the carrier $f_0$ of more than 50 dB can be obtained with a surface wave filter and a selective carrier amplifier. This circuit is significantly simpler than that in FIG. 7, but has the disadvantage that the tolerance of $f_0$ in the transmitting unit must be very small and that the high-quality filter must show a high precision and aging stability.

Figure 9:
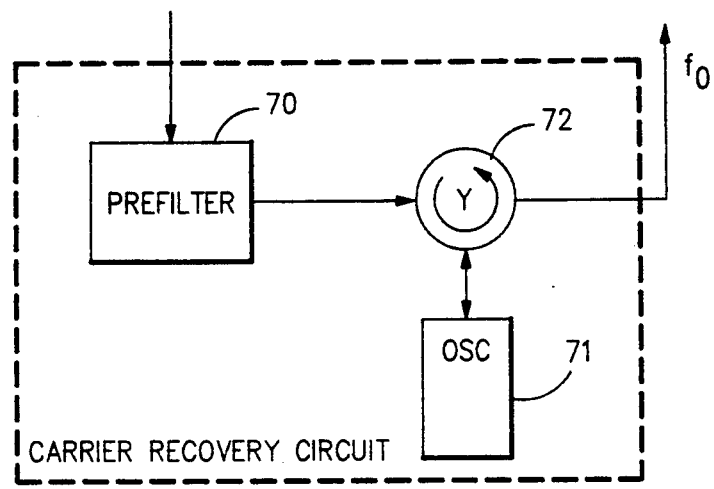
FIG. 9 is a block diagram of a third exemplifying embodiment of a carrier recovery circuit with an injection-synchronized oscillator.

A third example is shown in FIG. 9. Here again, the spectrum containing the transmitter carrier reaches a pre-filter 70, which suppresses the residual signal relative to the carrier. An oscillator 71, injection synchronized by means of the output signal of the pre-filter 70 and a Y-circulator 72 is synchronized to the frequency $f_0$ of the received carrier.

Some additional features will be explained below. As an example of a suitable carrier frequency $f_0$, a value of 450 MHz was given in the description so far. A suitable frequency is any carrier frequency with which the frequency band to be converted can be converted into a transmission frequency band, which is less than one octave wide based on its lowest frequency, i.e., in which the value of the highest frequency is less than twice the value of the lowest frequency.

The analogous multi-channel transmission system described above is subject to a high requirement for the signal-to-noise ratio, namely, more than 52 dB. The non-linearities of parts of the system (laser driver, semiconductor laser including feedbacks by the optical waveguide section, receiver input stage with low-noise amplifier) are therefore particularly critical. It is therefore desirable to monitor the critical parts of the system in operation and, if necessary, to generate an alarm signal.

Figure 10:
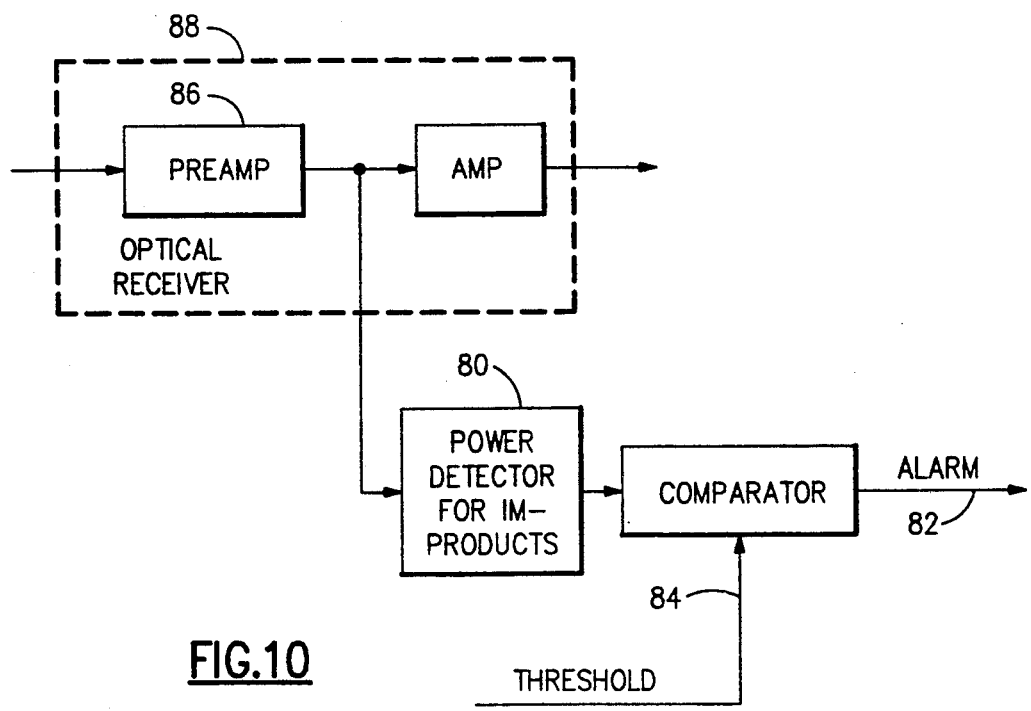
FIG. 10 is a block diagram showing an optical receiver connected to a power detector for intermodulating products.

It is to be feared that the second-order intermodulation products will increase to a particularly great extent as a result of aging or malfunction of such parts. According to the invention, as shown in FIG. 10, the receiving unit contains a power detector 80 for the intermodulation products, which generates an alarm signal 82 when these exceed a preset threshold value 84. In this way, it is not necessary to transmit special pilot tones for monitoring the system. The signal to be monitored can appropriately be the output signal of the pre-amplifier stage 86, also referred to as the input stage, of the optical receiver 88.

In the above exemplifying embodiments, the modulator causing the single-sideband amplitude modulation of the carrier is represented as a mixer with a single-sideband filter connected in series. Any other types of modulators producing such a modulation are, of course, suitable; for example, a modulator operating by the so-called phase method or a modulation operating according to the pilot tone process (Weaver process) such as are explained, for example, in Meinke-Gundlach, "Taschenbuch der Hochfrequenztechnik", (Handbook of High-Frequency Technology), 4th Edition, Volume 4, Springer-Verlag, Berlin, Heidelberg, New York, Tokyo, 1986, pp 1-6.

We claim:

1. A system for optically transmitting a frequency-division multiplex signal occupying a wide frequency band over a single optical waveguide, comprising:
   a transmitter unit including:
   a filter portion, responsive to a wise frequency band (FB) signal, for providing a first transmission signal covering less than one octave (FB$_2$) and a modulating signal covering more than one octave (FB$_1$);
   a modulator, responsive to the modulating signal, for amplitude modulating a carrier ($f_0$) signal, for providing a second transmission signal covering a single sideband (UB$_1$) which, referred to its lowest frequency, is less than one octave wide; and
   an electrical/optical converter portion responsive to the first and second transmission signals for conversion, respectively, into first and second optical signals of different wavelengths and for combining said optical signals into a wavelength-division multiplex signal for transmission on an optical cable; and
   a receiver including;
   a wavelength demultiplexer portion, responsive to the wavelength-division multiplex signal, for providing the first and second optical signals;
   an optical to electrical converter portion, responsive to the first and second optical signals for providing the first and second transmission signals;
   a demodulator responsive to the second transmission signal for providing the modulating signal; and
   means responsive to the modulating signal and the first transmission signal for providing the wide frequency band signal.

2. A system as claimed in claim 1, characterized in that the filter portion of the transmitter unit is for providing more than two transmission frequency bands by dividing the wide frequency band (FB) into more than two sub-bands and converting each of those sub-bands which, referred to their lowest frequency, are wider than one octave, into a transmission frequency band less than one octave wide by single-sideband amplitude modulation of a carrier, and that the receiver recovers the wide frequency bands by correspondingly more than two reverse processing operations.

3. A system as claimed in claim 1, characterized in that the wide frequency band extends over an approximate range of 47–440 MHz and that the filter portion of the transmitter unit divides the wide frequency band into a lower sub-band ($FB_1$) from about 47–230 MHz and an upper sub-band ($FB_2$) from about 230–440 MHz and in that the modulator is for providing the second transmission signal covering a transmission frequency band from about 497–680 MHz.

4. A system as claimed in claim 1, characterized in that the modulator for providing the single-sideband does not suppress the carrier during modulation, or suppresses the carrier during modulation but adds it to the second transmission signal, and that the receiver includes a carrier recovery circuit which recovers the carrier ($f_0$) signal from the second transmission signal provided by the optical to electrical converter portion and provides it to the demodulator (8) for reconverting the transmission frequency band (C).

5. A system as claimed in claim 1, characterized in that the modulator (1) is for effecting single-sideband amplitude modulation which suppresses the carrier ($f_0$) signal during modulation, that the transmitter unit transmits no carrier to the receiver, and that the receiver includes a carrier generator (14) which provides to the demodulator (8) for reconverting the transmission frequency band a demodulating signal having the same frequency as the carrier used in the transmitter unit.

6. A system as claimed in claim 1, characterized in that the modulator includes plural sub-band filters ($B_{10}$–$B_{12}$), plural modulators ($M_{10}$–$M_{12}$), plural single sideband filters ($E_{10}$–$E_{12}$), and a combiner (40) for providing the second transmission signal covering the single sideband in several parts.

7. A system as claimed in claim 6, characterized in that the plural filters ($B_{10}$–$B_{12}$) which divide the less than one octave ($FB_1$) band of the modulating signal into several sub-bands, that the plural modulators and plural single sideband filters ($M_{10}$, $E_{10}$ to $M_{12}$, $E_{12}$) convert the sub-bands to corresponding higher-frequency bands by single-sideband amplitude modulation, and that the combiner (40) combines the several higher-frequency bands to form the single sideband ($UB_1$).

8. A system as claimed in claim 7, characterized in that each of the sub-bands, referred to its lowest frequency, is less than one octave wide.

9. A system as claimed in claim 4, characterized in that the carrier recovery circuit includes a phase-locked loop (51, 52, 53) and a control circuit (54) which, to avoid incorrect synchronization, controls the phase-locked loop at the beginning of a synchronization process in such a way that the oscillator of the phase-locked loop oscillates at a predetermined frequency.

10. A system as claimed in claim 9, characterized in that the carrier recovery circuit includes a detector (55) for detecting a spectral component produced in case of incorrect synchronization which, when detecting said spectral component, delivers to the control circuit (54) a signal initiating a resynchronization.

11. A system as claimed in claim 4, characterized in that the carrier recovery circuit consists of a high-quality filter for the carrier (60) and a carrier amplifier (61).

12. A system as claimed in claim 4, characterized in that carrier recovery circuit consists of a filter for the carrier (70) and an injection-synchronized oscillator (71).

13. A system as claimed in claim 1, characterized in that the receiver includes a detector (80) for intermodulation products occurring as a result of non-linearities in the system, into which is provided an output signal of the optical receiver or the output signal from its input stage, and which, if the intermodulation products exceed a preset threshold value, emits an alarm signal.

14. A system as claimed in claim 2, characterized in that the modulator for providing the single-sideband does not suppress the carrier ($f_0$) signal during modulation, or suppresses the carrier during modulation but adds it to the second transmission signal, and that the receiver includes a carrier recovery circuit which recovers the carrier ($f_0$) signal from the second transmission signal and provides it to the demodulator (8) for reconverting the transmission frequency band (C).

15. A system as claimed in claim 3, characterized in that the modulator for providing the single-sideband does not suppress the carrier ($f_0$) signal during modulation, or suppresses the carrier during modulation but adds it to the second transmission signal, and that the receiver includes a carrier recovery circuit which recovers the carrier ($f_0$) signal from the second transmission signal and provides it to the demodulator (8) for reconverting the transmission frequency band (C).

16. A system as claimed in claim 2, characterized in that the modulator (1) is for effecting single-sideband amplitude modulation which suppresses the carrier ($f_0$) signal during modulation, that the transmitter unit transmits no carrier to the receiver, and that the receiver includes a carrier generator (14) which provides to the demodulator (8) for reconverting the transmission frequency band a demodulating signal having the same frequency as the carrier used in the transmitter unit.

17. A system as claimed in claim 3, characterized in that the modulator (1) is for effecting single-sideband amplitude modulation which suppresses the carrier ($f_0$) signal during modulation, that the transmitter unit transmits no carrier to the receiver, and that the receiver includes a carrier generator (14) which provides to the demodulator (8) for reconverting the transmission frequency band a demodulating signal having the same frequency as the carrier used in the transmitter unit.

18. A system as claimed in claim 2, characterized in that the modulator includes plural sub-band filters ($B_{10}$–$B_{12}$), plural modulators ($M_{10}$–$M_{12}$), plural single sideband filters ($E_{10}$–$E_{12}$), plural amplifiers ($V_{10}$–$V_{12}$), and a combiner (40) for providing the sideband amplitude modulation which converts the wide frequency second transmission signal covering the single sideband in several parts.

19. A system as claimed in claim 18, characterized in that the plural filters ($B_{10}$–$B_{12}$) which divide the less than one octave ($FB_1$) band into several sub-bands, that the plural modulators and plural single sideband filters ($M_{10}$, $E_{10}$ to $M_{12}$, $E_{12}$) convert the sub-bands to corresponding higher-frequency bands by single-sideband amplitude modulation, and that the combiner (40) combines the several higher-frequency bands to form the single sideband (UB₁).

20. A system as claimed in claim 19, characterized in that each of the sub-bands, referred to its lowest frequency, is less than one octave wide.

21. A transmitter for optically transmitting a frequency-division multiplex signal occupying a wide frequency band over a single optical waveguide, comprising:
- a filter portion, responsive to a wide frequency band (FB) signal, for providing a first transmission signal covering less than one octave ($FB_2$) and a modulating signal covering more than one octave ($FB_1$);
- a modulator, responsive to the modulating signal, for single-sideband amplitude modulating a carrier ($f_0$) signal, for providing a second transmission signal covering a frequency band ($UB_1$) which, referred to its lowest frequency, is less than one octave wide; and
- an electrical to optical converter portion responsive to the first and second transmission signals for conversion, respectively, into first and second optical signals of different wavelengths and for combining said optical signals into a wavelength-division multiplex signal for transmission on the optical waveguide.

22. A receiver for optically receiving a frequency-division multiplex optical signal occupying a wide frequency band over a single optical waveguide, comprising:
- a wavelength demultiplexer portion, responsive to the wavelength-division multiplex signal, for providing first and second optical signals;
- an optical to electrical converter portion, responsive to the first and second optical signals for providing first and second electrical signals;
- a demodulator responsive to the second electrical signal for providing a demodulated signal; and
- means responsive to the demodulated signal and the first electrical signal for combining the demodulated and first electrical signal into a wide frequency band electrical signal.

* * * * *

UNITED STATES PATENT AND TRADEMARK OFFICE
CERTIFICATE OF CORRECTION

PATENT NO. : 5,162,937
DATED : November 10, 1992
INVENTOR(S) : Heidemann et al

It is certified that error appears in the above-identified patent and that said Letters Patent is hereby corrected as shown below:

At column 8, line 41, please change "wise" to --wide--.

At column 9, line 10, after "frequency", please insert the words --band (FB) signal from the recovered transmission frequency--.

At column 10, line 51, please change "recoverting" to --reconverting--.

Signed and Sealed this

Twelfth Day of October, 1993

Attest:

BRUCE LEHMAN

Attesting Officer

Commissioner of Patents and Trademarks